US011132389B2

(12) United States Patent
Cho et al.

(10) Patent No.: US 11,132,389 B2
(45) Date of Patent: Sep. 28, 2021

(54) METHOD AND APPARATUS WITH LATENT KEYWORD GENERATION

(71) Applicant: RESEARCH & BUSINESS FOUNDATION SUNGKYUNKWAN UNIVERSITY, Suwon-si (KR)

(72) Inventors: Tae Min Cho, Suwon-si (KR); Jee Hyong Lee, Seoul (KR); Noo Ri Kim, Suwon-si (KR); Sung Tak Oh, Seoul (KR); Jae Dong Lee, Suwon-si (KR); Hye Woo Lee, Namyangju-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 803 days.

(21) Appl. No.: 15/071,790

(22) Filed: Mar. 16, 2016

(65) Prior Publication Data
US 2016/0275083 A1  Sep. 22, 2016

(30) Foreign Application Priority Data

Mar. 18, 2015 (KR) .................. 10-2015-0037571

(51) Int. Cl.
*G06F 17/00* (2019.01)
*G06F 16/31* (2019.01)

(52) U.S. Cl.
CPC .................. *G06F 16/313* (2019.01)

(58) Field of Classification Search
None
See application file for complete search history.

(56) References Cited

U.S. PATENT DOCUMENTS 6,424,971 B1 * 7/2002 Kreulen ............... G06F 16/355
707/737
7,275,029 B1 * 9/2007 Gao ...................... G06F 40/253
704/9

(Continued)

FOREIGN PATENT DOCUMENTS

| JP | 2000-259627 A | 9/2000 |
| JP | 2010-146430 A | 7/2010 |
| JP | 2012-3334 A | 1/2012 |

OTHER PUBLICATIONS

Cho, Taemin, et al. "Latent Keyphrase Generation By Combining Contextually Similar Primitive Words." *Soft Computing and Intelligent Systems (SCIS), 2014 Joint 7th International Conference on and Advanced Intelligent Systems (ISIS), 15th International Symposium on.* IEEE, 2014. (7 pages, in English).

(Continued)

*Primary Examiner* — Hasanul Mobin
(74) *Attorney, Agent, or Firm* — NSIP Law

(57) ABSTRACT

Provided are a method and an apparatus for generating a keyword. The method for generating a keyword in a target document includes: extracting primitive single words from the target document; generating a candidate keyword by a combination of the primitive single words; calculating cohesion score between a first word and a second word included in the candidate keyword; calculating a context score of the first word and the second word based on similarity between two contexts by determining a periphery of a word where the first word and the second word simultaneously occur in a neighboring document as one context and determining the target document as a remaining one context; and selecting a final keyword based on the cohesion score between the first word and the second word and the context score of the first word and the second word.

24 Claims, 7 Drawing Sheets

(56) References Cited

U.S. PATENT DOCUMENTS

| | | | | |
|---|---|---|---|---|
| 2002/0052730 | A1* | 5/2002 | Nakao | G06F 40/258 704/10 |
| 2002/0107735 | A1* | 8/2002 | Henkin | G06Q 30/0255 705/14.55 |
| 2004/0111465 | A1* | 6/2004 | Chuang | H04L 29/06 709/203 |
| 2004/0210434 | A1* | 10/2004 | Wang | G06F 40/253 704/9 |
| 2005/0108001 | A1* | 5/2005 | Aarskog | G06F 17/271 704/10 |
| 2005/0278325 | A1* | 12/2005 | Mihalcea | G06F 16/3344 |
| 2007/0198506 | A1* | 8/2007 | Attaran Rezaei | G06F 21/6218 |
| 2009/0197225 | A1* | 8/2009 | Sheehan | G09B 17/00 434/169 |
| 2011/0145229 | A1* | 6/2011 | Vailaya | G06F 16/334 707/723 |
| 2012/0131015 | A1* | 5/2012 | Al Badrashiny | G09B 7/00 707/748 |
| 2012/0278341 | A1* | 11/2012 | Ogilvy | G06F 16/313 707/749 |
| 2014/0108369 | A1* | 4/2014 | Nijjer | G06F 16/24578 707/706 |
| 2016/0162806 | A1* | 6/2016 | Beigman Klebanov | G06N 20/00 706/12 |

OTHER PUBLICATIONS

Korean Office Action dated Apr. 11, 2016 in counterpart Korean Patent Application No. 10-2015-0037571 (6 pages, in Korean).

* cited by examiner

FIG. 7

| Method | Precision | Recall | F-score |
|---|---|---|---|
| 2-word | 0.58 | 5.37 | 1.04 |
| more than 3-word | 0.63 | 4.79 | 1.12 |

METHOD AND APPARATUS WITH LATENT KEYWORD GENERATION

CROSS-REFERENCE TO RELATED APPLICATIONS

This application claims the benefit of priority of Korean Patent Application No. 10-2015-0037571 filed on Mar. 18, 2015, all of which are incorporated by reference in their entirety herein.

BACKGROUND OF THE INVENTION

Field of the Invention

The present invention relates to a method and an apparatus for generating a keyword. More particularly, the present invention relates to a method for generating a latent keyword which does not directly occur in a document in order to select a keyword from a given document and an apparatus thereof.

Related Art

A system for selecting a keyword according to the related art includes three steps. First, after candidate keywords are extracted from a document and scores of the candidate keywords are calculated, respectively, a candidate keyword having the highest score is selected as a final key of the document. However, the above method selects only a phrase which directly occurs in the document when extracting the candidate keyword so that a latent keyword which does not occur in the document is not selected.

In addition to the above method, there is a method which extracts candidate keywords from a document, calculates attribute values of respective candidate keywords, and selects a final keyword by applying a machine learning scheme. However, the above method selects only a phrase occurring in a document as the candidate keyword.

SUMMARY OF THE INVENTION

The present invention provides a method of generating a latent keyword that generates a phrase which does not occur in a document and calculates a score of the generated candidate keyword to select a final latent keyword of a given document and an apparatus thereof.

In an aspect, a method for generating a keyword in a target document is provided. The method includes: extracting primitive single words from the target document; generating a candidate keyword by a combination of the primitive single words; calculating cohesion score between a first word and a second word included in the candidate keyword; calculating a context score of the first word and the second word based on similarity between two contexts by determining a periphery of a word where the first word and the second word simultaneously occur in a neighboring document as one context and determining the target document as a remaining one context; and selecting a final keyword based on the cohesion score between the first word and the second word and the context score of the first word and the second word.

The cohesion score may be calculated based on the number of times of the first word and the second word which occur within a predetermined window range.

The closer a distance between the first word and the second word is, the cohesion score may be calculated to have higher cohesion score.

The cohesion score may be calculated to use cohesion score of a neighboring document as well as cohesion score of the target document.

The higher similarity between the target document and the neighboring document is, the higher a weight applied to the cohesion score in the neighboring document may be.

The context score may be calculated by multiplying a number in a vector form converted from the words in the two contexts by a number in a vector converted from a word occurring in the target document.

A bag-of-words model may be used to convert the words in the two contexts into the number in the vector form.

The final candidate keyword score may be calculated by normalizing the cohesion score and the context score, applying a weight to the normalized cohesion score and the normalized context score, and summing the weight applied cohesion score and context score.

The neighboring document may include n (n is an optional natural number) documents having the highest similarity between the neighboring document and the target document.

In another aspect, an apparatus for generating a keyword in a target document is provided. The apparatus includes: a primitive word extractor configured to extract primitive single words from the target document; a candidate keyword generator configured to generate a candidate keyword by a combination of the primitive single words; a cohesion score calculator configured to calculate cohesion score between a first word and a second word of individual words included in the candidate keyword; a context score calculator configured to calculate a context score of the first word and the second word based on similarity between two contexts by determining a periphery of a word where the first word and the second word simultaneously occur in a neighboring document as one context and determining the target document as a remaining one context; and a final keyword selector configured to select a final keyword based on the cohesion score between the first word and the second word and the context score of the first word and the second word.

The cohesion score may be calculated based on the number of times of the first word and the second word which occur within a predetermined window range.

The closer a distance between the first word and the second word is, the cohesion score may be calculated to have higher cohesion score.

The cohesion score may be calculated to use cohesion score of a neighboring document as well as cohesion score of the target document.

The higher similarity between the target document and the neighboring document is, the higher a weight applied to the cohesion score in the neighboring document may be.

The context score may be calculated by multiplying a number in a vector form converted from the words in the two contexts by a number in a vector converted from a word occurring in the target document.

A bag-of-words model may be used to convert the words in the two contexts into the number in the vector form.

The final candidate keyword score may be calculated by normalizing the cohesion score and the context score, applying a weight to the normalized cohesion score and the normalized context score, and summing the weight applied cohesion score and context score.

The neighboring document may include n (n is an optional natural number) documents having the highest similarity between the neighboring document and the target document.

In another aspect, a system for generating a keyword in a target document is provided. The system includes: a web database configured to store a plurality of electronic documents; and an apparatus for generating a keyword configured to extract primitive single words from the target document in the web database, to generate a candidate keyword by a combination of the primitive single words, to calculate cohesion score between a first word and a second word included in the candidate keyword, to calculate a context score of the first word and the second word based on similarity between two contexts by determining a periphery of a word where the first word and the second word simultaneously occur in a neighboring document as one context and determining the target document as a remaining one context, and to select a final keyword based on the cohesion score between the first word and the second word and the context score of the first word and the second word.

In accordance with the method and the apparatus for generating a latent keyword, a latent keyword which does not occur in a document can be selected. The above overcomes a problem of a method of selecting a keyword according to the related art in that only a keyword occurring in the document is selected. Accordingly, a keyword of a wider range can be selected.

BRIEF DESCRIPTION OF THE DRAWINGS

FIG. 7 is a table illustrating the performance evaluation of the apparatus for generating a latent keyword according to an embodiment of the present invention.

DESCRIPTION OF EXEMPLARY EMBODIMENTS

Figure 1:
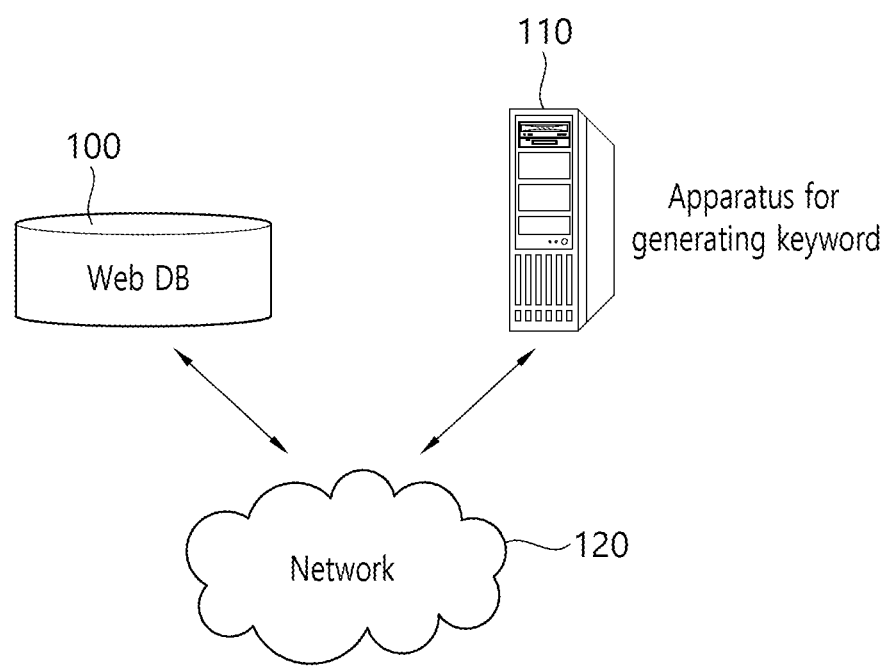
FIG. 1 a diagram illustrating a system for generating a latent keyword according to an embodiment of the present invention.

Rather, these example embodiments are provided so that this disclosure will be thorough and complete, and will fully convey the scope of the present inventive concept to those skilled in the art.

However, the embodiment is not limited to the specific embodiment, but the embodiment includes all modifications, equivalents, and substitutes belonging to the technical scope of the embodiment without departing from the spirit of the embodiment.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

In addition, when a component is referred to as being "connected to" or "linked to" another component, the component may be directly connected to or linked to another component or an intervening component may be present therebetween. In contrast, if a component is referred to as being "directly connected to" or "directly linked to" another component, an intervening component may not be present therebetween.

The terms used in the specification are for the purpose of explaining specific embodiments and have no intention to limit the disclosure. Unless the context indicates otherwise, the singular expression may include the plural expression. In the following description, the term "include" or "has" will be used to refer to the feature, the number, the step, the operation, the component, the part or the combination thereof without excluding the presence or addition of one or more features, the numbers, the steps, the operations, the components, the parts or the combinations thereof.

Unless defined otherwise, the terms including technical and scientific terms used in this specification may have the meaning that can be commonly apprehended by those skilled in the art. The terms, such as the terms defined in the commonly-used dictionary, must be interpreted based on the context of the related technology and must not be interpreted ideally or excessively.

Hereinafter, exemplary embodiments will be described in more detail with reference to accompanying drawings. In the following description, for the illustrative purpose, the same components will be assigned with the same reference numerals, and the repetition in the description about the same components will be omitted in order to avoid redundancy.

FIG. 1 a diagram illustrating a system for generating a latent keyword according to an embodiment of the present invention. As shown in FIG. 1, the system for generating a latent keyword according to an embodiment of the present invention may include a web database (DB) 100, an apparatus 110 for generating a latent keyword, and a network 120.

Referring to FIG. 1, the web database is a database configured to store a plurality of electronic documents. The web database 100 may transmit the electronic documents to the apparatus 110 for generating a latent keyword through the network 120. The electronic documents transmitted to the apparatus 110 for generating a latent keyword from the web database 100 may include a target document and a neighboring document. The target document is a document serving as a generation target of a latent keyword by the apparatus 110 for generating a latent keyword. The neighboring document is a document for making reference to insufficient information in order to evaluate a keyword of the target document.

The apparatus 110 for generating a latent keyword may generate the latent keyword based on an electronic document received from the web database 100. However, according to the embodiment of the present invention, the apparatus 110 for generating a latent keyword may generate the latent keyword based on a document included in the apparatus 110 or a document received from other devices. That is, the apparatus 110 for generating a latent keyword does not always need to be operatively associated with the web database 100. The apparatus 110 for generating a latent keyword may be configured by devices such as a PC, a notebook computer, a tablet PC, a smart phone, or other portable devices.

The apparatus 110 for generating a latent keyword may extract primitive single words from a target document to generate the candidate keyword through a combination of the primitive single words. In this case, the candidate keyword may include a word created by the combination of the primitive single words. That is, the combination of the primitive single words may be included in the target document or may not be included in the target document. Since the combination of the primitive single words is not included in the target document, the latent keyword may not be generated by the method of selecting a keyword according to the related art (method of counting the number of candidate keywords or measuring that the candidate keyword occurs in a title).

Accordingly, the apparatus 110 for generating a latent keyword according to the embodiment of the present invention introduces a factor such as a cohesion score and a context score in order to calculate the latent keyword. The apparatus 110 for generating a latent keyword extracts two optional single words included in the candidate keyword to calculate cohesion score between the two words. A neighboring document may be used to calculate the cohesion score. Further, the apparatus 110 for generating a latent keyword may calculate a context score of the two extracted words based on similarity between two contexts by determining peripheries of words where the two extracted words simultaneously occur from the neighboring document as one context and determining the target document as a remaining one context. In addition, the apparatus 110 for generating a latent keyword may select a final keyword based on the cohesion score and the context score.

The apparatus 110 for generating a latent keyword serves as a web server and may be connected to a client device (not shown) to generate the keyword. That is, when the client device selects a specific target document on a web database to transmit a request for generating a selection signal and a keyword, the apparatus 110 for generating a latent keyword may receive target document data and neighboring document data from the web database to generate the latent keyword. Next, the apparatus 110 for generating a latent keyword may transmit the selected latent keyword to the client device. The client device may be connected to the apparatus 110 for generating a latent keyword through the network 120. A plurality of client devices may be provided.

The network 120 may include a wired/wireless network. A wireless communication network may include a mobile communication network such as 3G, 4G, LTE, or WiBro. A wired communication network may include an Internet based Ethernet.

Figure 2:
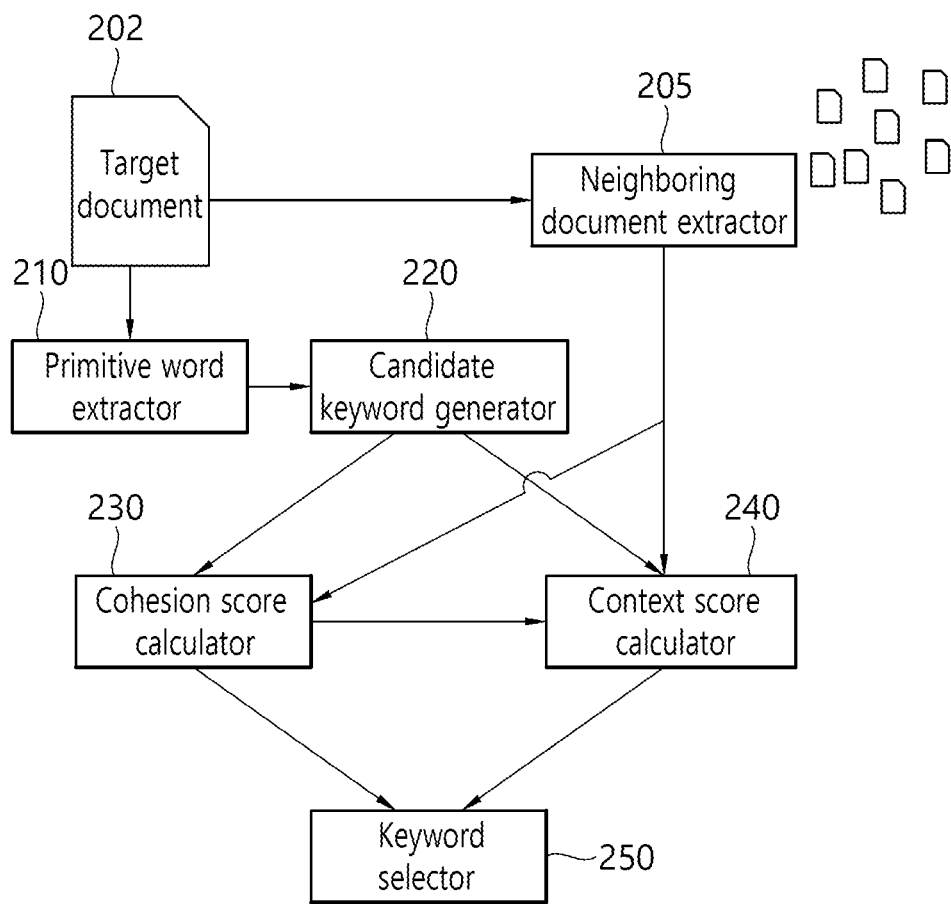
FIG. 2 is a block diagram schematically illustrating an apparatus for generating a latent keyword according to an embodiment of the present invention.

FIG. 2 is a block diagram schematically illustrating an apparatus for generating a latent keyword according to an embodiment of the present invention. As shown in FIG. 2, the apparatus for generating a latent keyword according to an embodiment of the present invention may include a primitive word extractor 210, a candidate keyword generator 220, a cohesion score calculator 230, a context score calculator 240, a keyword selector 250, and a neighboring document extractor 205.

Referring to FIG. 2, a user may select a target document 202 through a user interface (not shown) to request a keyword with respect to the target document 202.

The primitive word extractor 210 extracts a plurality of primitive single words occurring in the target document 202. The primitive single word has a word form instead of a phrase form, and may be extracted based on an occurrence frequency as a word having a high importance in a corresponding target document 202. The primitive word extractor 210 may extract only a pure word while removing impossible words such as punctuation marks and postpositional words through a preprocessing procedure.

The candidate keyword generator 220 generates a candidate keyword by an optional combination of a plurality of primitive single words extracted from the primitive word extractor 210. The number of the combined words may be controlled by user setting. That is, the candidate keyword may be extracted through the combination of two words, and the candidate keyword may be generated through a combination of three or more words. As described above, the generated candidate keyword may directly occur in the target document 202 or may not occur. This will be described as follows.

Figure 3:
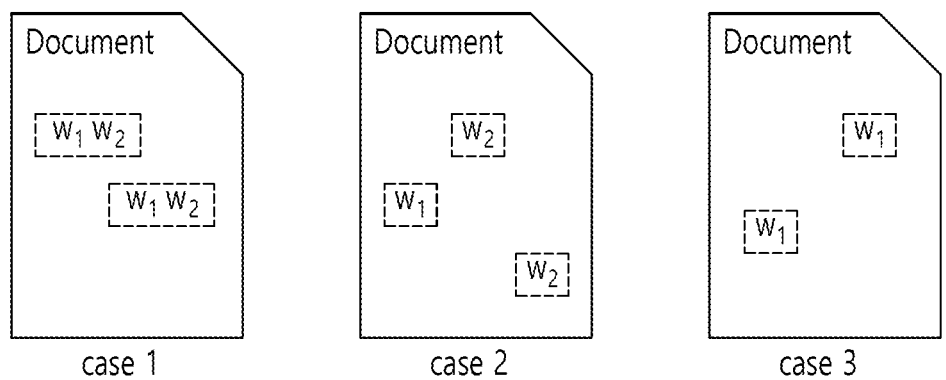
FIG. 3 is a diagram illustrating three cases of latent keyword distribution in the apparatus for generating a latent keyword according to an embodiment of the present invention.

FIG. 3 is a diagram illustrating three cases of latent keyword distribution in the apparatus for generating a latent keyword according to an embodiment of the present invention.

Referring to FIG. 3, in a case 1, a keyword $k[w_1w_2]$ (represents a combination of an optional word 1 ($w_1$) and an optional word 2 ($w_2$)) simultaneously occurs in a corresponding document. In this case, the keyword $k[w_1w_2]$ may be obtained by using a method of selecting a keyword by measuring the number of times of simultaneous occurrence in a corresponding document.

In a case 2, the keyword $k[w_1w_2]$ may separately occur. In this case, the keyword $k[w_1w_2]$ may not be obtained as a keyword upon measuring the number of times of the simultaneous occurrence. However, the keyword may be obtained by controlling a window size for determining the simultaneous occurrence.

In a case 3, the keyword $k[w_1w_2]$ never occurs in the target document. However, the keyword $k[w_1w_2]$ does not continuously occur but may be a primitive keyword in view of only meaning. The above case may be analyzed to include at least ¼ of real total keywords through an experiment. The related art cannot obtain such a keyword by measuring the number of times of the simultaneous occurrence. However, when using the method for generating a latent keyword according to the present invention, the latent keyword may be obtained by applying a cohesion score and a context score in a neighboring document. Hereinafter, a procedure of obtaining the cohesion score and the context score in the neighboring document will be described in detail.

Referring back to FIG. 2, since information is insufficient to evaluate a candidate keyword which does not occur in the target document 202 in only the target document 202 as in the case 3, the neighboring document extractor 205 extracts an additionally referred neighboring document. The neighboring document is extracted based on a cosine correlation value used to evaluate the similarity between two documents. The neighboring document extractor 205 may extract n documents having the highest cosine correlation value with the target document 202 as the neighboring document. The n is an optional natural number and may be a variable which may be controlled through the user interface. In addition, when extracting the neighboring document, only documents during a specific time period may be extracted through time setting. Detailed setting may be applied by determining a category and a region to extract a neighboring document such as a specific category, a specific field, and a specific author. An expression for calculating a cosine correlation used to extract the neighboring document is as follows.

$$sim(d_g, d_c) = \frac{d_g \cdot d_c}{\|d_g\| \times \|d_c\|} \quad \text{[Expression 1]}$$

where, $sim(d_g, d_c)$ represents similarity between a target document and an optional document. The $d_g$ represents a word weight vector of the target document. The $d_c$ represents a word weight vector of an optional document (candidate neighboring document). The $d_g$ and $d_c$ may be defined by normalized Bag-of-Words cosine similarity. That is, a Bag-of-Words model represents a word weight of a document in a vector. The cosine similarity is used to calculate the similarity between vectors.

Through the above expression 1, the similarity between the target document and the optional document is calculated, and a document having a higher score is extracted as a neighboring document. The extracted neighboring document may be used to calculate the cohesion score and the context score.

The cohesion score calculator 230 calculates cohesion score based on an optional word included in the candidate keyword generated from the candidate keyword generator 220. In general, the cohesion score is defined as the number of times of two words which co-occur in the same sentence. According to an embodiment of the present invention, numerous variations and modifications will become the above definition method. When a word $pw_x$ and a word $pw_y$ are included in the candidate keyword, the cohesion score calculator 230 calculates the cohesion score as the number of time of two words which co-occur in order to calculate cohesion score of two words. This will be described in detailed with reference to FIG. 4.

Figure 4:
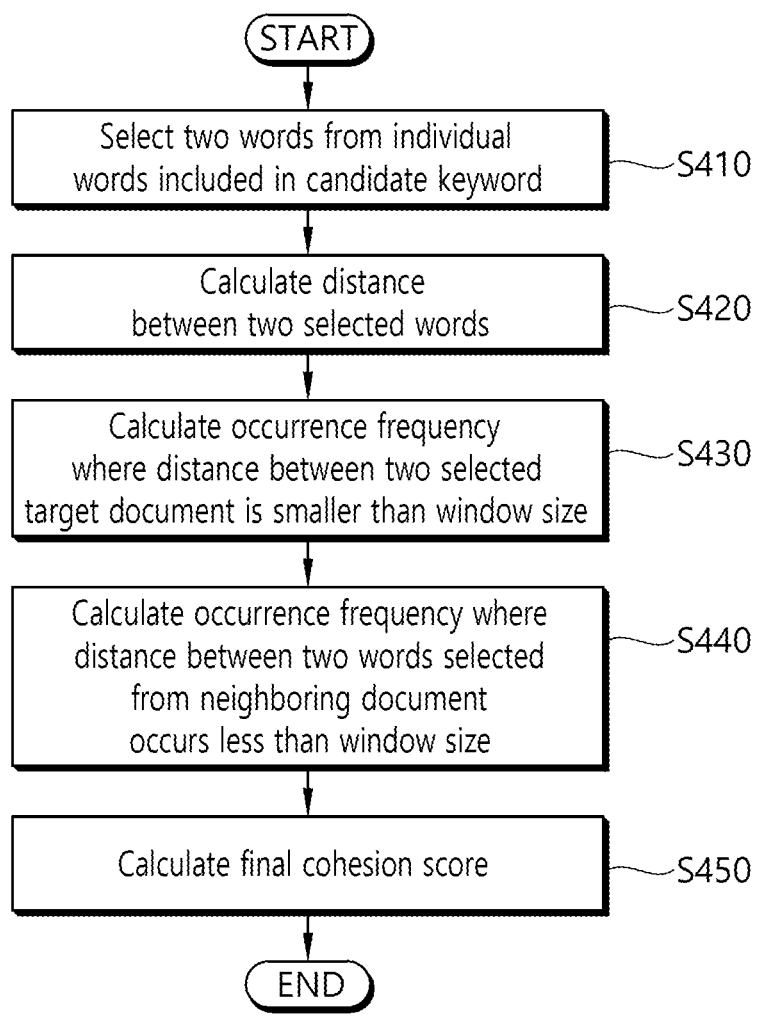
FIG. 4 is a flowchart illustrating an operation of a cohesion score calculator of the apparatus for generating a latent keyword according to an embodiment of the present invention.

FIG. 4 is a flowchart illustrating an operation of a cohesion score calculator of the apparatus for generating a latent keyword according to an embodiment of the present invention.

Referring to FIG. 4, a cohesion score calculator 230 selects two optional words from individual words included in a candidate keyword (S410). If a plurality of words is included in the candidate keyword, two or more words may be selected. The two or more selected words are used to calculate the cohesion score and the context score. Next, the cohesion score calculator 230 selects other candidate keywords to repeatedly perform the same operation so that scores with respect to all generated candidate keywords are calculated.

Next, the cohesion score calculator 230 calculates a distance between the two selected words (S420). The distance may be calculated based on the number of words interposed between the two selected words.

The cohesion score calculator 230 calculates an occurrence frequency where the distance between the two selected words in the target document occurs less than a window size (S430). In this case, the window size is defined by user setting. If the distance between the two selected words in the target document is smaller than the window size, although the two words are included in different sentence, the two words may simultaneously occur. In particular, the closer two words between the pw and the $pw_j$ is, the cohesion score calculator may calculate higher cohesion score. This may be calculated by a following expression 2.

$$co_d(pw_x, pw_y) = \sum_{i,j} \frac{|pos(pw_{x,i}) - pos(pw_{y,j})|}{ws} \quad \text{[Equation 2]}$$

where, the $co_d$ represents a simultaneous occurrence score in a document, the $pw_x$ represents a primitive word x included in a specific candidate keyword, the $pw_{x,i}$ represents an i-th primitive word, the $pos(.)$ represents a position of the primitive word in a document, and the ws represents a window size.

After the calculation with respect to the target document, the cohesion score calculator 230 calculates an occurrence frequency where a distance between two words selected from a neighboring document occurs less than the window size as in the calculation with respect to the target document (S440). That is, the cohesion score between the word $pw_x$ and the word $pw_y$ is not calculated based on only the cohesion score of the target document but uses the cohesion score of the neighboring document together. In this case, since the cohesion score of the neighboring document becomes better information, more similar the cohesion score of the neighboring document and the cohesion score of the target document is, the cosine correlation (similarity) may be used as a weight by reflecting the above characteristic. This may be calculated by a following expression 3.

$$S_{coh}(pw_x, pw_y) = \sum_{n \in N} sim(d_g, d_n) \times co_n(pw_x, pw_y) \quad \text{[Expression 3]}$$

where, the $S_{coh}$ represents a cohesion score, the g represents a target document, the N represents the target document and the neighboring document, the sim represents the similarity between the $d_g$ and the $d_n$, and the $co_n$ represents a simultaneous occurrence frequency score in the n.

If the cohesion score of the neighboring document is calculated, a final cohesion score is calculated through the expression 3 (S450).

According to another embodiment of the present invention, when combining the cohesion score of the target document with the cohesion score of the neighboring document, the scores may be equally distributed with a ratio of 1:1, and may be calculated with a different ratio by setting. Alternatively, the scores may be distributed with a different ratio in the cases (see FIG. 3). In some cases, the cohesion score of the neighboring document may be set to be final cohesion score.

Referring back to FIG. 2, if the cohesion score calculator 230 terminates calculation of the cohesion score, the context score calculator 240 may calculate a context score based on the similarity between two contexts by determining the target document 202 as one context and determining a periphery of a word where a word $pw_x$ and a word $pw_y$ simultaneously occur in the neighboring document as one context. The above will be described in detail with reference to FIG. 5.

Figure 5:
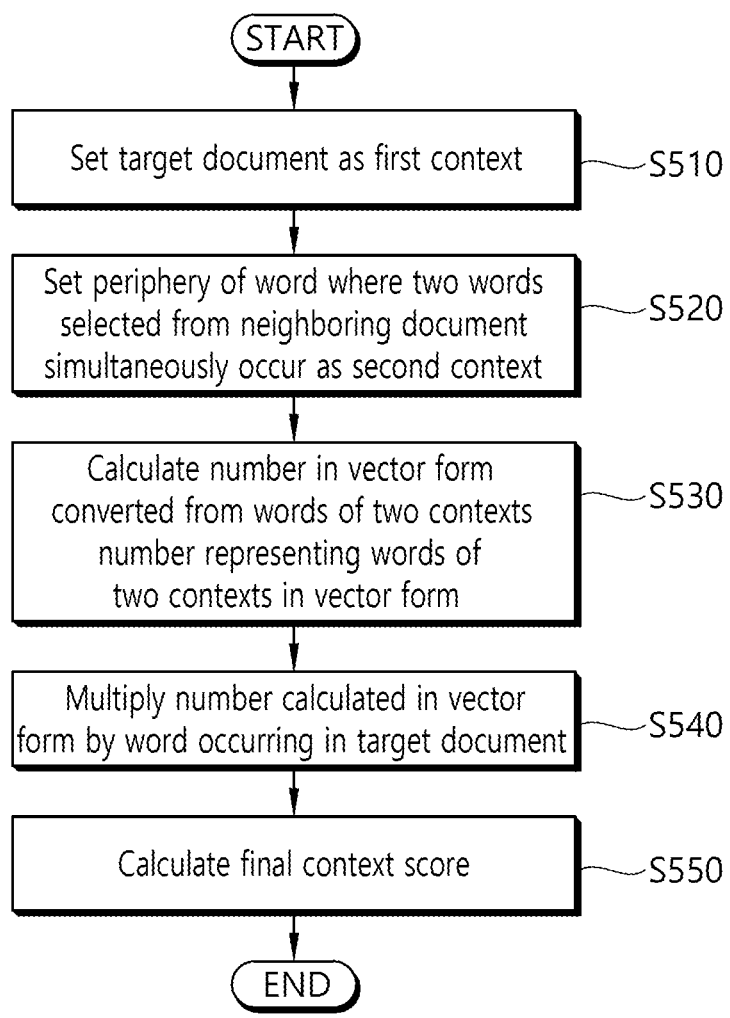
FIG. 5 is a flowchart illustrating an operation of a context score calculator of the apparatus for generating a latent keyword according to an embodiment of the present invention.

FIG. 5 is a flowchart illustrating an operation of a context score calculator of the apparatus for generating a latent keyword according to an embodiment of the present invention.

Referring to FIG. 5, a context score calculator 240 sets a target document as a first context (S510). Next, the context score calculator 240 sets a periphery of a word where two words selected from a neighboring document simultaneously occur as a second context (S520). In this case, the periphery of the word ranges a set of words close to two words which simultaneously occur. The range of the set of words may be clearly defined by user setting. For example, the range of the set of words may be defined based on the window size (e.g., a range having two window sizes). If a plurality of paragraphs occurs in a specific document, the context may be formed by a plurality of paragraphs. If the two selected context are similar to each other, a combination of the word $pw_x$ and the word $pw_y$ may be important in the target document. Accordingly, the two words may be scored in a numerically expressed scheme.

The context score calculator 240 calculates a number in a vector form converted from words of the set two contexts (S530). The above Bag-of-Words model may be used in a representing method in the vector form. Next, the context score calculator 240 multiplies a number calculated in the vector form by a number in a vector converted from the word occurring in the target document (S540). The context score calculator 240 calculates a value by multiplying the number calculated in the vector form by the number in the vector as a final context score (S550). This may be expressed by a following expression 4.

$$S_{con}(pw_x, pw_y) = \sum_{w_{i,g} \in d_g} \sum_{w_{j,gc} \in d_{gc}} F(w_{i,g}) \cdot F(w_{j,gc}) \cdot co(w_{i,g}, w_{j,gc})$$ [Expression 4]

where, the $d_g$ represents a word weight vector of a target document, the $d_{gc}$ represents a word weight vector of a general context between a primitive word $pw_x$ and a primitive word $pw_y$, the $w_{i,g}$ represents a word i in the target document, the F(.) represents an occurrence frequency of a word, and the $co(w_{i,g}, w_{j,ge})$ represents a simultaneous occurrence score of the $w_{i,g}$ and the $w_{j,gc}$ in all documents.

Referring back to FIG. 2, the keyword selector 250 receives a cohesion score with respect candidate keywords from the cohesion score calculator 230 and receives a candidate keyword score evaluated based on a context from the context score calculator 240. Next, the keyword selector 250 normalizes the cohesion score with respect candidate keywords and the candidate keyword score and applies a weight to the normalized cohesion score and candidate keyword score to sum the weight applied cohesion score and candidate keyword score. This is expressed by a following expression 5.

$$S(pw_x, pw_y) = (1-\lambda) \cdot S_{coh}(pw_x, pw_y) + \lambda \cdot S_{con}(pw_x, pw_y)$$ [Expression 5]

where, the $S(pw_x, pw_y)$ represents a final score between a primitive word $pw_x$ and a primitive word $pw_y$, the $\lambda$ represents a type of damping factor obtained by applying a weight to the cohesion score or the context score, the $S_{coh}(pw_x, pw_y)$ represents a cohesion score between the primitive words $pw_x$ and $pw_y$, and the $S_{con}(pw_x, pw_y)$ represents a context score between the primitive words $pw_x$ and $pw_y$.

The cohesion score calculator 230, the context score calculator 240, and the keyword selector 250 calculate a final score with respect to all candidate keywords by repeatedly calculating the cohesion score, the context score, and the final score with respect to a plurality of candidate keywords.

Next, the keyword selector 250 may select m candidate keywords (the m may be changed by user setting) having the highest final score as the final keyword of the target document 202.

Simulation Result

In order to inspect the method for generating a latent keyword according to the present invention, an experiment is performed by a dataset which is extensive used in a keyword selection field. The dataset includes 2,000 abstracts of a specific paper. For proper inspection, data having abstracts having 100 words or less are omitted. Since only keywords which do not occur in the abstract are selected, keywords occurring in the abstract are omitted. Keywords having no two words are omitted.

There are no previous researches and studies having the same goal as that of the present experiment so that a reference experiment is configured as comparison with the present experiment. The method according to the present invention is compared with the reference experiment to be analyzed while changing the damping factor $\lambda$. The number n of the neighboring document and the window size w used for the experiment are 8 and 25, respectively.

Figure 6:
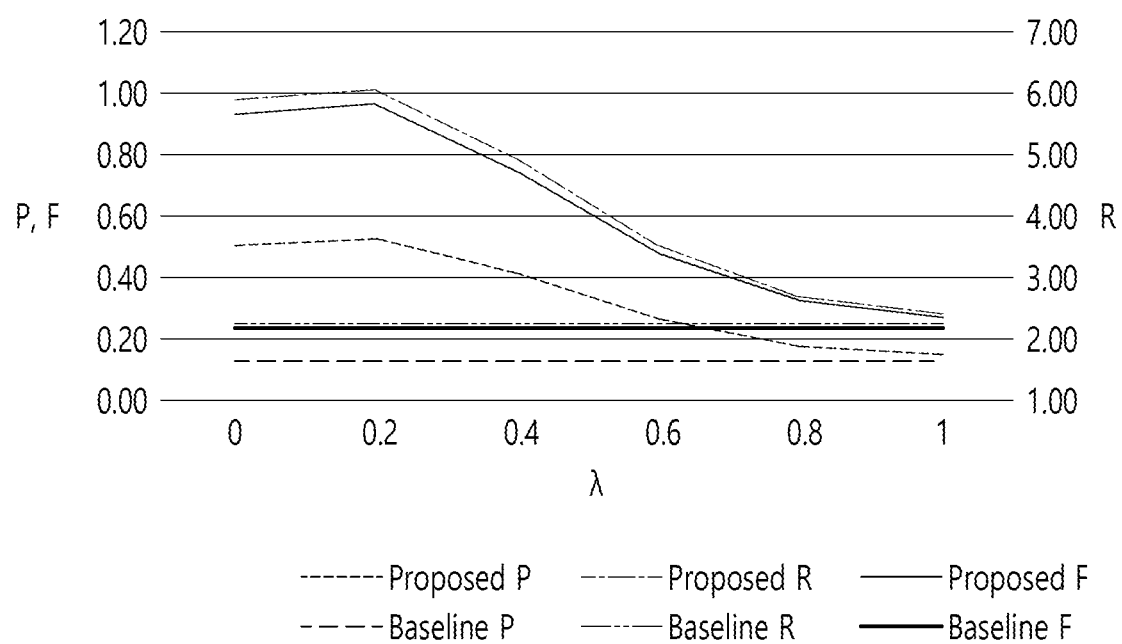
FIG. 6 is a graph illustrating performance evaluation of the apparatus for generating a latent keyword according to an embodiment of the present invention.

FIG. 6 is a graph illustrating performance evaluation of the apparatus for generating a latent keyword according to an embodiment of the present invention.

Referring to FIG. 6, as the experimental result, it is analyzed that the method for generating a latent keyword according to the present invention represents excellent performance in all of a precision evaluation score, a recall evaluation score, and an F-score evaluation score which are generally and extensively used in order to evaluate the precision of the keyword. In particular, when the damping factor $\lambda$ is 0.2, the method for generating a latent keyword according to the present invention selects the best keyword. In this case, it is confirmed that the performance of the present invention is at least four times as compared with the performance of the reference experiment.

FIG. 7 is a table illustrating the performance evaluation of the apparatus for generating a latent keyword according to an embodiment of the present invention.

Referring to FIG. 7, although the present invention represents the excellent performance in a latent keyword having 3 or more words as well as a latent keyword having two words, the selection of a keyword having more words may spread after this.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for generating a keyword in a target document, the method comprising:
    extracting, by a processor, primitive single words from the target document;
    generating, by the processor, a candidate keyword from a combination of the primitive single words;
    calculating, by the processor, a cohesion score between a first word and a second word included in the candidate keyword, wherein the cohesion score is calculated based on a number of times of the first word and the second word which occur within a predetermined window range;
    calculating, by the processor, a context score of the first word and the second word based on similarity between a context of the target document and a context of a passage in a neighboring document in which the first word and the second word occur;

selecting, by the processor, a final candidate keyword as a final keyword based on the cohesion score and the context score; and generating, by the processor, a final candidate keyword score by normalizing the cohesion score and the context score, applying a weight to the normalized cohesion score and the normalized context score, and summing the weight applied cohesion score and context score.

2. The method of claim 1, wherein a distance between the first word and the second word is positively correlated with the cohesion score.

3. The method of claim 1, wherein the cohesion score is calculated based on a cohesion score of a neighboring document and a cohesion score of the target document.

4. The method of claim 3, wherein a similarity between the target document and the neighboring document is positively correlated with a weight applied to the cohesion score in the neighboring document.

5. The method of claim 1, wherein the context score is calculated by multiplying a number in a vector form converted from the first and second words in the first and second contexts by a number in a vector converted from a word occurring in the target document.

6. The method of claim 5, wherein a bag-of-words model is used to convert the first and second words in the first and second contexts into the number in the vector form.

7. The method of claim 1, wherein the neighboring document comprises n documents having a highest similarity between the neighboring document and the target document, wherein n is an optional natural number.

8. An apparatus for generating a keyword in a target document, the apparatus comprising at least one processor configured to:

extract primitive single words from the target document, generate a candidate keyword from a combination of the primitive single words, calculate a cohesion score between a first word and a second word of individual words included in the candidate keyword, wherein the cohesion score is calculated based on a number of times of the first word and the second word which occur within a predetermined window range, calculate a context score of the first word and the second word based on similarity between a context of the target document and a context of a passage in a neighboring document in which the first word and the second word occur, select a final candidate keyword as a final keyword based on the cohesion score and the context score, and generate a final candidate keyword score by normalizing the cohesion score and the context score, applying a weight to the normalized cohesion score and the normalized context score, and summing the weight applied cohesion score and context score.

9. The apparatus of claim 8, wherein a distance between the first word and the second word is positively correlated with the cohesion score.

10. The apparatus of claim 8, wherein the cohesion score is calculated based on a cohesion score of a neighboring document and a cohesion score of the target document.

11. The apparatus of claim 10, wherein a similarity between the target document and the neighboring document is positively correlated with a weight applied to the cohesion score in the neighboring document.

12. The apparatus of claim 8, wherein the context score is calculated by multiplying a number in a vector form converted from the first and second words in the first and second contexts by a number in a vector form converted from a word occurring in the target document.

13. The apparatus of claim 12, wherein a bag-of-words model is used to convert the first and second words in the first and second contexts into the number in the vector form.

14. The apparatus of claim 8, wherein the neighboring document comprises n documents having a highest similarity between the neighboring document and the target document, wherein n is an optional natural number.

15. A system for generating a keyword in a target document, the system comprising:

an apparatus comprising one or more processors configured to:

extract primitive single words from the target document among a plurality of electronic documents stored in a web database, generate a candidate keyword from a combination of the primitive single words, calculate a cohesion score between a first word and a second word included in the candidate keyword, wherein the cohesion score is calculated based on a number of times of the first word and the second word which occur within a predetermined window range, calculate a context score of the first word and the second word based on similarity between a context of the target document and a context of a passage in a neighboring document in which the first word and the second word occur, select a final candidate keyword as a final keyword based on the cohesion score and the context score, and generate a final candidate keyword score by normalizing the cohesion score and the context score, applying a weight to the normalized cohesion score and the normalized context score, and summing the weight applied cohesion score and context score.

16. The method of claim 1, wherein the primitive single words are preprocessed to remove punctuation and postpositional words.

17. The method of claim 1, wherein the neighboring document is extracted based on a cosine correlation value.

18. The method of claim 1, wherein the passage is selected based on proximity to the first word and the second word.

19. The method of claim 1, wherein the candidate keyword is selected based on the final candidate keyword score.

20. The method of claim 8, wherein the final keyword selector is further configured to select the candidate keyword based on the final candidate keyword score.

21. The system of claim 15, wherein the one or more processors are further configured to select the candidate keyword based on the final candidate keyword score.

22. The method of claim 1, wherein the selecting of the candidate keyword comprises selecting the candidate keyword for inclusion in the final keyword based on a weighted sum of the cohesion score and the context score.

23. The method of claim 8, wherein in the selection of the candidate keyword, the final keyword selector is further configured to select the candidate keyword for inclusion in the final keyword based on a weighted sum of the cohesion score and the context score.

24. The method of claim 15, wherein in the selection of the candidate keyword, the one or more processors are further configured to select the candidate keyword for inclusion in the final keyword based on a weighted sum of the cohesion score and the context score.

\* \* \* \* \*